United States Patent
Hayashi et al.

(10) Patent No.: US 12,209,052 B2
(45) Date of Patent: Jan. 28, 2025

(54) GLASS SUBSTRATE

(71) Applicant: Nippon Electric Glass Co., Ltd., Shiga (JP)

(72) Inventors: Masahiro Hayashi, Shiga (JP); Mayu Nishimiya, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 296 days.

(21) Appl. No.: 17/438,290

(22) PCT Filed: Mar. 6, 2020

(86) PCT No.: PCT/JP2020/009669
§ 371 (c)(1),
(2) Date: Sep. 10, 2021

(87) PCT Pub. No.: WO2020/189337
PCT Pub. Date: Sep. 24, 2020

(65) Prior Publication Data
US 2022/0204385 A1 Jun. 30, 2022

(30) Foreign Application Priority Data

Mar. 20, 2019 (JP) .................... 2019-052377

(51) Int. Cl.
*C03C 3/093* (2006.01)
(52) U.S. Cl.
CPC .................... *C03C 3/093* (2013.01)
(58) Field of Classification Search
CPC .................. C03C 3/091; C03C 3/093
See application file for complete search history.

(56) References Cited

U.S. PATENT DOCUMENTS

| 2007/0191207 A1* | 8/2007 | Danielson | C03C 3/095 501/72 |
| 2012/0088648 A1* | 4/2012 | Ellison | C03C 3/093 501/59 |
| 2013/0237401 A1 | 9/2013 | Kawaguchi et al. | |
| 2014/0377525 A1 | 12/2014 | Kawaguchi et al. | |

FOREIGN PATENT DOCUMENTS

| JP | 2013-151407 | 8/2013 |
| WO | 2012/063643 | 5/2012 |
| WO | 2012/121283 | 9/2012 |

OTHER PUBLICATIONS

International Preliminary Report on Patentability and Written Opinion of the International Searching Authority issued Sep. 16, 2021 in International (PCT) Application No. PCT/JP2020/009669.
International Search Report issued May 26, 2020 in International (PCT) Application No. PCT/JP2020/009669.

* cited by examiner

*Primary Examiner* — Elizabeth A. Bolden
(74) *Attorney, Agent, or Firm* — Wenderoth, Lind & Ponack, L.L.P.

(57) ABSTRACT

A glass substrate of the present invention has a strain point of from 695° C. to 740° C., a temperature at $10^{4.5}$ dPa·s of 1,300° C. or less, a liquidus viscosity of $10^{4.5}$ dPa·s or more, a Young's modulus of 78 GPa or more, and a thermal shrinkage rate in heat treatment at 500° C. for 1 hour of 20 ppm or less.

1 Claim, 1 Drawing Sheet

GLASS SUBSTRATE

TECHNICAL FIELD

The present invention relates to a glass substrate, and more specifically, to a glass substrate suitable for an OLED display or a liquid crystal display. More particularly, the present invention relates to a glass substrate suitable for a display driven by an oxide TFT or a low-temperature p-Si·TFT (LTPS).

BACKGROUND ART

A glass substrate has hitherto been widely used as a substrate fora flat panel display, such as a liquid crystal display, a hard disk, a filter, a sensor, or the like. In recent years, in addition to a related-art liquid crystal display, an OLED display has been actively developed by virtue of its self-luminescence, high color reproducibility, wide viewing angle, high-speed response, high definition, and the like. Some of the developed OLED displays have already been put to practical use.

Meanwhile, a liquid crystal display or an OLED display for a mobile device, such as a smartphone, requires a screen with ultra-high definition because the display has a small area but needs to display a lot of information. The display also requires high-speed response because a moving image is displayed thereon.

In such application, an OLED display or a liquid crystal display driven by a LTPS is suitable. The OLED display emits light when a current flows through an OLED element serving as a constituent of a pixel. Accordingly, a material exhibiting low resistance and a high electron mobility is used as a drive TFT element. As such material, an oxide TFT formed typically of indium gallium zinc oxide (IGZO) has attracted attention, aside from the above-mentioned LTPS. The oxide TFT has low resistance, a high mobility, and can be formed at relatively low temperature. The related-art p-Si·TFT, in particular the LTPS, is liable to have variations in TFT characteristics upon its formation on a large-size glass substrate, owing to instability of an excimer laser to be used in polycrystallization of an amorphous Si (a-Si) film. Accordingly, in a TV application or the like, display unevenness is liable to occur in a screen. Meanwhile, the oxide TFT is excellent in homogeneity of TFT characteristics upon its formation on a large-size glass substrate. Accordingly, the oxide TFT has attracted attention as a potential TFT formation material, and some of the oxide TFTs have already been put to practical use.

A glass substrate to be used for a high-definition display is required to have various characteristics. In particular, the glass substrate is required to have the following characteristics (1) and (2).

(1) To contain an alkaline component (in particular, a Li component or a Na component) at a low content or be substantially free of the alkaline component, because an alkali ion is diffused during heat treatment into a semiconductor substance having been formed into a film and causes degradation in the characteristics of the film when the glass contains the alkaline component at a high content.

(2) The glass substrate is subjected to heat treatment at several hundred degrees C. in steps of film formation, dehydrogenation, crystallization of a semiconductor layer, annealing, and the like. As a problem caused during the heat treatment, there is given a pattern shift caused by thermal shrinkage of the glass substrate and the like. As the definition of the display becomes higher, the heat treatment temperature becomes higher, whereas a tolerance for the pattern shift becomes smaller. Accordingly, the glass substrate is required to undergo little dimensional change at the time of the heat treatment. The dimensional change at the time of the heat treatment is mainly caused by thermal shrinkage, film stress after film formation, and the like. Accordingly, in order to reduce the dimensional change at the time of the heat treatment, the glass substrate is required to have a high strain point and a high Young's modulus (or specific Young's modulus) of, for example, 78 GPa or more.

The glass substrate is required to have the following characteristics (3) to (5) from the viewpoint of manufacturing the glass substrate.
(3) To have a low forming temperature in order to increase the lifetime of forming equipment.
(4) To have excellent meltability in order to prevent melt defects, such as bubbles, stones, and cords.
(5) To have excellent devitrification resistance in order to prevent a devitrified crystal from being mixed in the glass substrate.

SUMMARY OF INVENTION

Technical Problem

One approach to reducing a thermal shrinkage rate is, for example, to design the strain point to be high as described above. However, when the strain point is too high, there is a demerit in that a melting temperature and a forming temperature increase to reduce the lifetimes of melting equipment and forming equipment.

Another approach to reducing the thermal shrinkage rate is a method involving decreasing a cooling rate at the time of forming as described above. However, when the cooling rate is decreased, there is a demerit in that the production efficiency of the glass substrate is lowered.

The present invention has been made in view of the above-mentioned circumstances, and a technical object of the present invention is to provide a glass substrate capable of reducing dimensional change at the time of heat treatment without lowering product ion efficiency.

Solution to Problem

The inventors of the present invention have made extensive investigations, and as a result, have found that the above-mentioned technical object can be achieved by restricting the glass characteristics of a glass substrate within predetermined ranges. The finding is proposed as the present invention. That is, according to one embodiment of the present invention, there is provided a glass substrate, which has a strain point of from 695° C. to 740° C., a temperature at 104.5 dPa·s of 1,300° C. or less, a liquidus viscosity of 104.5 dPa·s or more, a Young's modulus of 78 GPa or more, and a thermal shrinkage rate in heat treatment at 500° C. for 1 hour of 20 ppm or less. Herein, the "strain point" refers to a value measured on the basis of a method of ASTM C336. The "temperature at 104.5 dPa·s" refers to a value measured by a platinum sphere pull up method. The "liquidus viscosity" refers to a value obtained by measuring the viscosity of glass at its liquidus temperature by the platinum sphere pull up method. The "liquidus temperature" refers to a temperature at which a devitrified crystal (crystalline foreign matter) is observed in glass when glass powder that has passed through a standard 30-mesh sieve (500 μm) and remained on a 50-mesh sieve (300 μm) is placed in a platinum boat and kept for 24 hours in a gradient heating furnace set to from 1,100° C. to 1,350° C., followed by taking the platinum boat out of the gradient heating furnace. The "Young's modulus" refers to a value measured on the basis of a dynamic elastic modulus measurement method (resonance method) based on JIS R1602. The "thermal shrinkage rate in heat treatment at 500° C. for 1 hour" was measured by the following method. First, as illustrated in FIG. 1A, a strip-shaped sample G measuring 160 mm by 30 mm was prepared as a measurement sample. In each of both end portions of the strip-shaped sample G in its longitudinal direction, a marking M was formed at a position at a distance of from 20 mm to 40 mm from the end edge through use of #1000 waterproof abrasive paper. After that, as illustrated in FIG. 1B, the strip-shaped sample G having the markings M formed thereon was folded and split into two pieces along a direction orthogonal to the markings M to produce sample pieces Ga and Gb. Then, only one sample piece Gb was subjected to the following heat treatment: its temperature was increased from normal temperature to 500° C. at 5° C./min, kept at 500° C. for 1 hour, and then decreased at 5° C./min. After the heat treatment, as illustrated in FIG. 1C, under a state in which the sample piece Ga not subjected to the heat treatment and the sample piece Gb subjected to the heat treatment were arranged in parallel, position shift amounts ($\Delta L_1$ and $\Delta L_2$) between the markings M of the two sample pieces Ga and Gb were read with a laser microscope, and the thermal shrinkage rate was calculated by the following equation. In the following equation, $l_0$ mm represents the initial distance between the markings M.

Thermal shrinkage rate(ppm)=[{$\Delta L_1$(μm)+$\Delta L_2$(μm)}× $10^3$]/$l_0$(mm)

The glass substrate according to the one embodiment of the present invention is restricted to have a strain point of from 695° C. to 740° C., a temperature at $10^{4.5}$ dPa·s of 1,300° C. or less, a liquidus viscosity of $10^{4.5}$ dPa·s or more, a Young's modulus of 78 GPa or more, and a thermal shrinkage rate in heat treatment at 500° C. for 1 hour of 20 ppm or less. With this configuration, the glass substrate capable of reducing dimensional change at the time of heat treatment without lowering production efficiency can be obtained.

The glass substrate according to the one embodiment of the present invention is restricted to have a strain point of 740° C. or less, and a thermal shrinkage rate in heat treatment at 500° C. for 1 hour of 20 ppm or less. The two characteristics are difficult to simultaneously achieve using the related-art manufacturing equipment and manufacturing method, but the two characteristics can be simultaneously achieved by adopting, for example, a method involving making an annealing path longer than in the related art and making an annealing rate lower than in the related art. Although this method has a risk of lowering the productivity of the glass substrate, the production efficiency of the glass substrate can be maintained by forming a mother glass sheet of a super large size of G10.5 and then obtaining two G6-sized glass substrates from the mother glass sheet.

In addition, it is preferred that the glass substrate according to the one embodiment of the present invention comprise as a glass composition, in terms of mol %, 60% to 70% of $SiO_2$, 10% to 15% of $Al_2O_3$, 0% to 5% of $B_2O_3$, 0% to 0.1% of $Li_2O$, 0% to 0.1% of $Na_2O$, 0% to 1% of $K_2O$, 0% to 8% of MgO, 0% to 10% of CaO, 0% to 10% of SrO, 0% to 10% of BaO, 0% to 10% of ZnO, 0% to 10% of $P_2O_5$, and 0% to 1% of $SnO_2$.

DESCRIPTION OF EMBODIMENTS

Figure 1A:
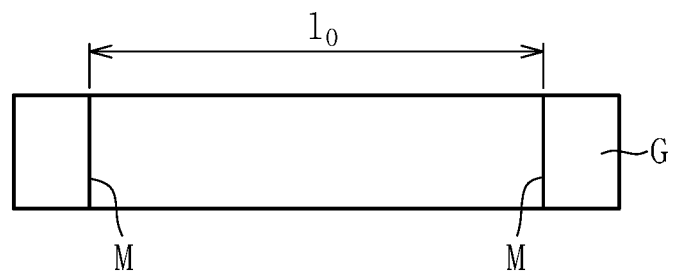
FIG. 1A is an explanatory view for illustrating a method of measuring a thermal shrinkage rate.
Figure 1B:
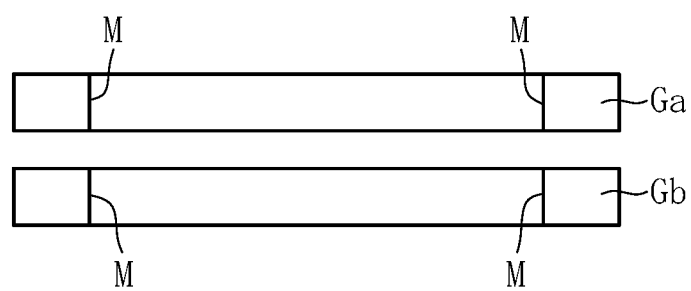
FIG. 1B is an explanatory view for illustrating a method of measuring a thermal shrinkage rate.
Figure 1C:
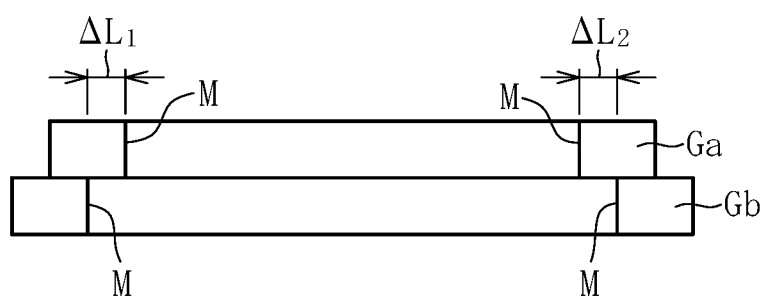
FIG. 1C is an explanatory view for illustrating a method of measuring a thermal shrinkage rate.

A glass substrate of the present invention has a thermal shrinkage rate in heat treatment at 500° C. for 1 hour of 20 ppm or less, preferably 19 ppm or less, 18 ppm or less, 17 ppm or less, 16 ppm or less, 15 ppm or less, 14 ppm or less, or 13 ppm or less, particularly preferably 12 ppm or less. With this configuration, even when the glass substrate is subjected to heat treatment in a manufacturing process of a LTPS, a failure, such as a pattern shift, hardly occurs. When the thermal shrinkage rate is too low, the production efficiency of the glass substrate is liable to lower. Accordingly, the thermal shrinkage rate is preferably 1 ppm or more, 2 ppm or more, 3 ppm or more, or 4 ppm or more, particularly preferably 5 ppm or more.

As a strain point becomes higher, the thermal shrinkage rate can be lowered more. The strain point is 695° C. or more, preferably 697° C. or more, 700° C. or more, 702° C. or more, 705° C. or more, 710° C. or more, 711° C. or more, 712° C. or more, 713° C. or more, or 714° C. or more, particularly preferably 715° C. or more. Meanwhile, when the strain point is too high, a melting temperature and a forming temperature increase, and hence the production efficiency of the glass substrate is liable to lower. Accordingly, the strain point is 740° C. or less, preferably 735° C. or less, 730° C. or less, 725° C. or less, or 720° C. or less, particularly preferably 715° C. or less. The most preferred range of the strain point is from 715° C. to 735° C.

As a temperature at $10^{4.5}$ dPa·s becomes lower, a load to be applied to forming equipment can be reduced more. The temperature at $10^{4.5}$ dPa·s is 1,300° C. or less, preferably 1,290° C. or less, 1,280° C. or less, 1,275° C. or less, 1,270° C. or less, 1,265° C. or less, 1,260° C. or less, or 1,255° C. or less, particularly preferably 1,250° C. or less. Meanwhile, when the temperature at $10^{4.5}$ dPa·s is too low, the strain point cannot be designed to be high. Accordingly, the temperature at $10^{4.5}$ dPa·s is preferably 1,150° C. or more, 1,170° C. or more, 1,180° C. or more, 1,185° C. or more, 1,190° C. or more, or 1,195° C. or more, particularly preferably 1,200° C. or more.

When forming into a sheet shape is performed by an overflow down-draw method or the like, devitrification resistance is important. In consideration of the forming temperature of glass comprising $SiO_2$, $Al_2O_3$, $B_2O_3$, and an alkaline earth metal oxide (RO) in its glass composition, a liquidus temperature is preferably 1,300° C. or less, 1,280° C. or less, 1,270° C. or less, 1,250° C. or less, 1,240° C. or less, 1,230° C. or less, 1,220° C. or less, or 1,210° C. or less, particularly preferably 1,200° C. or less. In addition, a liquidus viscosity is $10^{4.5}$ dPa·s or more, preferably $10^{4.5}$ dPa·s or more, $10^{4.7}$ dPa·s or more, $10^{4.8}$ dPa·s or more, $10^{4.9}$ dPa·s or more, $10^{5.8}$ dPa·s or more, or $10^{5.2}$ dPa·s or more, particularly preferably $10^{5.3}$ dPa·s or more.

As a Young's modulus becomes higher, the glass substrate becomes less liable to deform. The Young's modulus is 78 GPa or more, preferably 78.5 GPa or more, 79 GPa or more, or 79.5 GPa or more, particularly preferably from 80 GPa to 120 GPa.

The glass substrate of the present invention preferably has the following characteristics in addition to the above-mentioned characteristics.

A suitable upper limit range of a thermal expansion coefficient is 45×10$^{-7}$/° C. or less, 42×10$^{-7}$/° C. or less, or 41×10$^{-7}$/° C. or less, particularly 40×10$^{-7}$/° C. or less, and a suitable lower limit range thereof is 35×10$^{-7}$/° C. or more, or 36×10$^{-7}$/° C. or more, particularly 37×10$^{-7}$/° C. or more. When the thermal expansion coefficient falls outside the above-mentioned ranges, the thermal expansion coefficient does not match those of various films (e.g., a-Si and p-Si), with the result that failures, such as film peeling and dimensional change at the time of heat treatment, are liable to occur. The "thermal expansion coefficient" refers to an average thermal expansion coefficient measured in the temperature range of from 30° C. to 380° C., and may be measured with, for example, a dilatometer.

An etching depth obtained through immersion in a 10 mass % HF aqueous solution at room temperature for 30 minutes is preferably 20 µm or more, 23 µm or more, 25 µm or more, 27 µm or more, 28 µm or more, or from 29 µm to 50 µm, particularly preferably from 30 µm to 40 µm. When the etching depth is too small, it becomes difficult to thin the glass substrate in a slimming step. The etching depth serves as an indicator of an etching rate. Specifically, a large etching depth indicates a high etching rate, and a small etching depth indicates a low etching rate.

A β-OH value is preferably 0.50/mm or less, 0.45/mm or less, 0.40/mm or less, 0.35/mm or less, 0.30/mm or less, 0.25/mm or less, 0.20/mm or less, or 0.15/mm or less, particularly preferably 0.10/mm or less. The strain point can be increased by reducing the β-OH value. A method of reducing the β-OH value is exemplified by the following methods: (1) a method involving selecting raw materials having low water contents; (2) a method involving adding a component (such as Cl or SO$_3$) that reduces the water content in the glass; (3) a method involving reducing the water content in a furnace atmosphere; (4) a method involving performing N$_2$ bubbling in molten glass; (5) a method involving adopting a small melting furnace; (6) a method involving increasing the flow rate of the molten glass; and (7) a method involving adopting an electric melting method. Herein, the "β-OH value" refers to a value calculated by using the following equation after measuring the transmittances of the glass with an FT-IR.

β-OH value=$(1/X)\log(T_1/T_2)$

X: Glass thickness (mm)
$T_1$: Transmittance (%) at a reference wavelength of 3,846 cm$^{-1}$
$T_2$: Minimum transmittance (%) at a wavelength around a hydroxyl group absorption wavelength of 3,600 cm$^{-1}$ The glass substrate of the present invention preferably comprises as a glass composition, in terms of mol %, 60% to 70% of SiO$_2$, 10% to 15% of Al$_2$O$_3$, 0% to 5% of B$_2$O$_3$, 0% to 0.1% of Li$_2$O, 0% to 0.1% of Na$_2$O, 0% to 1% of K$_2$O, 0% to 8% of MgO, 0% to 10% of CaO, 0% to 10% of SrO, 0% to 10% of BaO, 0% to 10% of ZnO, 0% to 10% of P$_2$O$_5$, and 0% to 1% of SnO$_2$. The reasons why the content ranges of the components are limited as described above are described below. In the description of the content range of each component, the expression "%" means "mol %".

When the content of SiO$_2$ is too small, chemical resistance, particularly acid resistance, is liable to lower, and the strain point is liable to lower. Meanwhile, when the content of SiO$_2$ is too large, an etching rate with hydrofluoric acid or a mixed solution of hydrofluoric acid is liable to decrease. In addition, meltability is liable to lower owing to a high viscosity at high temperature. Further, a SiO$_2$-based crystal, particularly cristobalite, precipitates, and the liquidus viscosity is liable to lower. Accordingly, a suitable upper limit content of SiO$_2$ is 70%, 69.5%, 69%, 68.5%, or 68%, particularly 67.5%, and a suitable lower limit content thereof is 60%, 61%, 62%, 62.5%, 63%, 63.5%, 64%, or 64.5%, particularly 65%. The most preferred content range is from 65% to 67.5%.

When the content of Al$_2$O$_3$ is too small, the strain point lowers, a thermal shrinkage amount becomes larger, the Young's modulus lowers, and the glass substrate is liable to be deflected. Meanwhile, when the content of Al$_2$O$_3$ is too large, buffered hydrofluoric acid (BHF) resistance lowers and white turbidity is liable to occur in the surface of the glass. In addition, crack resistance is liable to lower. Further, a SiO$_2$—Al$_2$O$_3$-based crystal, particularly mullite, precipitates in the glass, and the liquidus viscosity is liable to lower. A suitable upper limit content of Al$_2$O$_3$ is 15% or 14.5%, particularly 14%, and a suitable lower limit content thereof is 10%, 10.5%, 11%, or 11.5%, particularly 12%. The most preferred content range is from 12% to 14%.

B$_2$O$_3$ is a component that acts as a melting accelerate component, and lowers the viscosity to improve the meltability. When the content of B$_2$O$_3$ is too small, B$_2$O$_3$ does not act sufficiently as a melting accelerate component, and the BHF resistance and the crack resistance are liable to lower. Further, the liquidus temperature is liable to increase. Meanwhile, when the content of B$_2$O$_3$ is too large, the strain point, heat resistance, and the acid resistance are liable to lower, and in particular, the strain point is liable to lower. In addition, the glass is liable to undergo phase separation. A suitable upper limit content of B$_2$O$_3$ is 5%, particularly 4.5%, and a suitable lower limit content thereof is 0%, 1%, 1.5%, or 2%, particularly 2.5%. The most preferred content range is from 2.5% to 4.5%.

Alkali metal oxides (Li$_2$O, Na$_2$O, and K$_2$O) degrade the characteristics of various films or semiconductor elements to be formed on the glass substrate, and hence the contents thereof are each preferably reduced to 0.1% (desirably 0.06%, 0.05%, or 0.02%, particularly desirably 0.01%).

MgO is a component that improves the meltability by lowering the viscosity at high temperature without lowering the strain point. In addition, MgO is most effective in reducing the density among ROs. However, when MgO is introduced in an excessive amount, a SiO$_2$-based crystal, particularly cristobalite, precipitates, and the liquidus viscosity is liable to lower. Further, MgO is a component that is susceptible to a reaction with BHF to form a product. There is a risk in that the reaction product may cause white turbidity in an element on the surface of the glass substrate or in the glass substrate through fixation onto the element or adhesion onto the glass substrate. Further, there is a risk in that an impurity, such as Fe$_2$O$_3$, may be mixed in the glass from a raw material for introducing MgO, such as dolomite, to reduce the transmittance of the glass substrate. Accordingly, a suitable upper limit content of MgO is 8%, 7.5%, 7%, or 6.5%, particularly 6%, and a suitable lower limit content thereof is 0%, 1%, 1.5%, 2%, 2.5%, 3%, 3.5%, or 4%, particularly 4.5%. The most preferred content range is from 4.5% to 6%.

As with MgO, CaO is a component that remarkably improves the meltability by lowering the viscosity at high temperature without lowering the strain point. However, when the content of CaO is too large, a SiO$_2$—Al$_2$O$_3$—RO-based crystal, particularly anorthite, precipitates, and the liquidus viscosity is liable to lower. In addition, the BHF resistance lowers, and there is a risk in that the reaction product may cause white turbidity in the element on the surface of the glass or in the glass substrate through fixation onto the element or adhesion onto the glass substrate. Accordingly, a suitable upper limit content of CaO is 10%, 9.5%, or 9%, particularly 8.5%, and a suitable lower limit content thereof is 0%, 1%, 2%, 3%, 3.5%, 4%, 4.5%, 5%, 5.5%, 5.6%, or 6%, particularly 6.5%. The most preferred content range is from 6.5% to 8.5%.

SrO is a component that enhances the chemical resistance and the devitrification resistance. However, when the ratio of SrO in all the ROs is too high, the meltability is liable to lower, and the density and the thermal expansion coefficient are liable to increase. Accordingly, the content of SrO is preferably from 0% to 10%, from 0% to 9%, from 0% to 8%, from 0% to 7%, or from 0% to 6%, particularly preferably from 0% to 5%.

BaO is a component that enhances the chemical resistance and the devitrification resistance. However, when the content of BaO is too large, the density is liable to increase. In addition, a $SiO_2$—$Al_2O_3$—$B_2O_3$—RO-based glass is generally hard to melt, and hence it is significantly important to enhance the meltability and reduce a defective rate attributed to bubbles, foreign matter, or the like from the viewpoint of supplying a high-quality glass substrate at low cost in large numbers. However, BaO is less effective in enhancing the meltability among the ROs. Accordingly, a suitable upper limit content of BaO is 10%, 9%, 8%, 7%, or 6%, particularly 5%, and a suitable lower limit content thereof is 0%, 0.1%, or 0.3%, particularly 0.2%.

ZnO is a component that improves the meltability and the BHF resistance. However, when the content of ZnO is too large, the glass is liable to be devitrified or the strain point lowers, with the result that it is difficult to secure the heat resistance. Accordingly, the content of ZnO is preferably from 0% to 10%, from 0% to 5%, from 0% to 3%, or from 0% to 2%, particularly preferably from 0% to 1%.

$P_2O_5$ is a component that lowers the liquidus temperature for a $SiO_2$—$Al_2O_3$—CaO-based crystal (in particular, anorthite) and a $SiO_2$—$Al_2O_3$-based crystal (in particular, mullite). However, when $P_2O_5$ is introduced in a large amount, the glass is liable to undergo phase separation. Accordingly, the content of $P_2O_5$ is preferably from 0% to 10%, from 0% to 5%, from 0% to 3%, from 0% to 2%, or from 0% to 1%, particularly preferably from 0% to 0.1%.

$SnO_2$ has a reduction action on bubbles in the glass as a fining agent. Meanwhile, when the content of $SnO_2$ is too large, a devitrified crystal of $SnO_2$ is liable to be generated in the glass. A suitable upper limit content of $SnO_2$ is 1%, 0.5%, or 0.4%, particularly 0.3%, and a suitable lower limit content thereof is 0%, 0.01%, or 0.03%, particularly 0.05%. The most preferred content range is from 0.05% to 0.3%.

Components other than the above-mentioned components may be introduced. The introduction amount of the other components is preferably 5% or less, or 3% or less, particularly preferably 1% or less.

$ZrO_2$ is a component that enhances chemical durability. However, when $ZrO_2$ is introduced in a large amount, a crystal of $ZrSiO_4$ is liable to be generated. A suitable upper limit content of $ZrO_2$ is 1%, 0.5%, 0.3%, or 0.2%, particularly 0.1%. It is preferred to introduce $ZrO_2$ at a content of 0.001% or more from the viewpoint of the chemical durability. The most preferred content range is from 0.001% to 0.1%. $ZrO_2$ may be introduced from a raw material or through elution from a refractory.

$TiO_2$ is a component that lowers the viscosity at high temperature and enhances the meltability, and is also a component that enhances the chemical durability. However, when $TiO_2$ is excessively introduced, an ultraviolet light transmittance is liable to lower. The content of $TiO_2$ is preferably 3% or less, 1% or less, 0.5% or less, 0.1% or less, 0.05% or less, or 0.03% or less, particularly preferably 0.01% or less. When $TiO_2$ is introduced in an extremely small amount (for example, 0.0001% or more), an effect of suppressing coloration caused by ultraviolet light is obtained. The most preferred content range is from 0.0001% to 0.01%.

$As_2O_3$ and $Sb_2O_3$ are each a component that acts as a fining agent, but are each a chemical substance that causes an environmental load, and hence it is desired to avoid the use thereof as much as possible. The content of each of $As_2O_3$ and $Sb_2O_3$ is preferably less than 0.3%, less than 0.1%, less than 0.09%, less than 0.05%, less than 0.03%, less than 0.01%, or less than 0.005%, particularly preferably less than 0.003%.

Iron is a component that is mixed in from a raw material as an impurity. When the content of iron is too large, there is a risk in that the ultraviolet light transmittance may lower. When the ultraviolet light transmittance lowers, there is a risk in that failures may occur in a photolithography step of producing a TFT, a step of aligning liquid crystal by using ultraviolet light, and a laser lift-off step in a plastic OLED manufacturing process. Accordingly, a suitable lower limit content of iron is, in terms of $Fe_2O_3$, 0.0001%, 0.0005%, or 0.001%, particularly 0.0015%, and a suitable upper limit content thereof is, in terms of $Fe_2O_3$, 0.01%, 0.009%, 0.008%, or 0.007%, particularly 0.006%. The most preferred content range is from 0.0015% to 0.006%.

$Cr_2O_3$ is a component that is mixed in from the raw material as an impurity. When the content of $Cr_2O_3$ is too large, failures may occur in a foreign matter test for an internal portion of a glass substrate using scattered light from incident light entering from an end surface of the glass substrate, because the light is hard to transmit during the test. Particularly in the case where the substrate has a size measuring 730 mm×920 mm or more, such failures are more liable to occur. In addition, in the case where the glass substrate has a small thickness (for example, 0.5 mm or less or 0.4 mm or less, particularly 0.3 mm or less), the restriction on the content of $Cr_2O_3$ is of great significance because the incident light entering from an end surface of the glass substrate is reduced. A suitable upper limit content of $Cr_2O_3$ is 0.001%, 0.0008%, 0.0006%, or 0.0005%, particularly 0.0003%, and a suitable lower limit content thereof is 0.00001%. The most preferred content range is from 0.00001% to 0.0003%.

$SO_3$ is a component that is mixed in from the raw material as an impurity. When the content of $SO_3$ is too large, bubbles called reboil are generated during melting and forming, and defects may occur in the glass. A suitable upper limit content of $SO_3$ is 0.005%, 0.003%, or 0.002%, particularly 0.001%, and a suitable lower limit content thereof is 0.0001%. The most preferred content range is from 0.0001% to 0.001%.

The glass substrate of the present invention is preferably formed by an overflow down-draw method. The overflow down-draw method is a method in which molten glass is caused to overflow from both sides of a trough-shaped refractory of a wedge shape, and the overflowing molten glasses are subjected to down-draw downward at the lower end of the wedge shape while being joined, to thereby form a glass substrate. When a glass substrate is produced by the overflow down-draw method, surfaces that are to serve as the surfaces of the glass substrate are formed in a state of free surfaces without being brought into contact with the refractory. As a result, it is possible to produce a glass substrate having good surface quality without polishing and an increase in area and a reduction in thickness are easily achieved as well.

It is also possible to form a glass substrate by, for example, any of other down-draw methods (such as a slot down method and a redraw method), a float method, and the like, besides the overflow down-draw method.

The thickness of the glass substrate of the present invention is not particularly limited, but is preferably 0.5 mm or less, 0.4 mm or less, or 0.35 mm or less, particularly preferably 0.3 mm or less. As the thickness becomes smaller, the weight of a device can be reduced more easily. Meanwhile, as the thickness becomes smaller, the glass substrate is more liable to be deflected. However, the glass substrate of the present invention has a high Young's modulus and a high specific Young's modulus, and hence failures attributed to deflection do not easily occur. The thickness may be adjusted by controlling, for example, the flow rate and the sheet-drawing speed at the time of glass manufacture.

EXAMPLES

The present invention is hereinafter described in detail by way of Examples. However, Examples below are merely examples, and the present invention is by no means limited to Examples below.

Tables 1 and 5 show Examples of the present invention (Sample Nos. 1 to 51).

TABLE 1

|   |   |   | No. 1 | No. 2 | No. 3 | No. 4 | No. 5 |
|---|---|---|---|---|---|---|---|
| Glass composition | $SiO_2$ | mol % | 67.32 | 67.97 | 67.34 | 64.92 | 64.87 |
|  | $Al_2O_3$ | mol % | 12.57 | 12.70 | 12.27 | 13.93 | 13.97 |
|  | $B_2O_3$ | mol % | 3.00 | 3.00 | 2.80 | 3.98 | 3.99 |
|  | $Na_2O$ | mol % | 0.0109 | 0.0131 | 0.0152 | 0.0109 | 0.0098 |
|  | $K_2O$ | mol % | 0.0021 | 0.0014 | 0.0021 | 0.0029 | 0.0014 |
|  | MgO | mol % | 6.02 | 5.69 | 7.01 | 6.04 | 5.05 |
|  | CaO | mol % | 6.49 | 6.49 | 6.24 | 7.00 | 7.98 |
|  | SrO | mol % | 2.02 | 1.43 | 1.23 | 2.02 | 2.03 |
|  | BaO | mol % | 2.46 | 2.60 | 2.98 | 1.99 | 1.99 |
|  | $TiO_2$ | mol % | 0.0025 | 0.0034 | 0.0025 | 0.0021 | 0.0025 |
|  | $ZrO_2$ | mol % | 0.0027 | 0.0055 | 0.0109 | 0.0055 | 0.0028 |
|  | $SnO_2$ | mol % | 0.0895 | 0.0895 | 0.0893 | 0.0898 | 0.0900 |
|  | $Fe_2O_3$ | mol % | 0.0038 | 0.0038 | 0.0034 | 0.0042 | 0.0051 |
| β-OH |  | /mm | 0.15 | 0.15 | 0.14 | 0.18 | 0.18 |
| Density |  | g/cm³ | 2.569 | 2.575 | 2.593 | 2.585 | 2.587 |
| Thermal expansion coefficient |  | ×10⁻⁷/° C. | 38.2 | 37.8 | 38.9 | 38.9 | 39.7 |
| Young's modulus |  | GPa | 82.3 | 82.2 | 82.9 | 82.8 | 82.4 |
| Strain point |  | ° C. | 722 | 725 | 719 | 717 | 716 |
| Temperature at $10^{4.5}$ dPa·s |  | ° C. | 1,255 | 1,260 | 1,250 | 1,226 | 1,227 |
| Liquidus temperature |  | ° C. | 1,188 | 1,191 | 1,183 | 1,177 | 1,216 |
| Liquidus viscosity (log η at TL) |  | dPa·s | 5.2 | 5.2 | 5.2 | 5.0 | 4.6 |
| Thermal shrinkage rate (500° C., 1 hour) |  | ppm | 12.2 | 11.9 | 12.6 | 12.8 | 12.9 |

|   |   |   | No. 6 | No. 7 | No. 8 | No. 9 | No. 10 |
|---|---|---|---|---|---|---|---|
| Glass composition | $SiO_2$ | mol % | 64.75 | 65.86 | 65.80 | 65.87 | 66.80 |
|  | $Al_2O_3$ | mol % | 14.14 | 13.98 | 14.02 | 14.05 | 13.00 |
|  | $B_2O_3$ | mol % | 4.04 | 3.01 | 3.02 | 3.05 | 3.05 |
|  | $Na_2O$ | mol % | 0.0133 | 0.0120 | 0.0131 | 0.0155 | 0.0128 |
|  | $K_2O$ | mol % | 0.0022 | 0.0014 | 0.0022 | 0.0022 | 0.0028 |
|  | MgO | mol % | 4.94 | 6.04 | 5.04 | 4.93 | 7.07 |
|  | CaO | mol % | 6.98 | 6.99 | 7.97 | 6.97 | 6.97 |
|  | SrO | mol % | 2.52 | 2.02 | 2.03 | 2.51 | 1.47 |
|  | BaO | mol % | 2.51 | 1.98 | 1.99 | 2.50 | 1.51 |
|  | $TiO_2$ | mol % | 0.0034 | 0.0025 | 0.0042 | 0.0017 | 0.0008 |
|  | $ZrO_2$ | mol % | 0.0045 | 0.0055 | 0.0082 | 0.0100 | 0.0108 |
|  | $SnO_2$ | mol % | 0.0911 | 0.0897 | 0.0899 | 0.0909 | 0.0880 |
|  | $Fe_2O_3$ | mol % | 0.0047 | 0.0042 | 0.0042 | 0.0039 | 0.0037 |
| β-OH |  | /mm | 0.18 | 0.15 | 0.15 | 0.15 | 0.15 |
| Density |  | g/cm³ | 2.608 | 2.589 | 2.592 | 2.613 | 2.559 |
| Thermal expansion coefficient |  | ×10⁻⁷/° C. | 39.8 | 38.7 | 39.6 | 40.0 | 38.0 |
| Young's modulus |  | GPa | 81.8 | 83.4 | 83.1 | 82.6 | 83.6 |
| Strain point |  | ° C. | 715 | 726 | 727 | 726 | 723 |
| Temperature at $10^{4.5}$ dPa·s |  | ° C. | 1,231 | 1,240 | 1,240 | 1,245 | 1,243 |
| Liquidus temperature |  | ° C. | 1,205 | 1,227 | 1,247 | 1,216 | 1,199 |
| Liquidus viscosity (log η at TL) |  | dPa·s | 4.8 | 4.6 | 4.5 | 4.8 | 4.9 |
| Thermal shrinkage rate (500° C., 1 hour) |  | ppm | 13.0 | 11.8 | 11.7 | 11.8 | 12.1 |

TABLE 2

|  |  |  | No. 11 | No. 12 | No. 13 | No. 14 | No. 15 |
|---|---|---|---|---|---|---|---|
| Glass composition | $SiO_2$ | mol % | 66.88 | 66.80 | 66.92 | 66.77 | 66.76 |
|  | $Al_2O_3$ | mol % | 13.04 | 13.00 | 13.00 | 13.02 | 13.01 |
|  | $B_2O_3$ | mol % | 2.96 | 3.00 | 2.97 | 3.00 | 3.03 |
|  | $Na_2O$ | mol % | 0.0107 | 0.0109 | 0.0108 | 0.0120 | 0.0115 |
|  | $K_2O$ | mol % | 0.0021 | 0.0014 | 0.0021 | 0.0014 | 0.0022 |
|  | MgO | mol % | 5.94 | 6.01 | 4.96 | 5.01 | 5.06 |
|  | CaO | mol % | 8.06 | 6.96 | 9.03 | 8.05 | 7.04 |
|  | SrO | mol % | 1.48 | 2.01 | 1.48 | 2.02 | 2.50 |
|  | BaO | mol % | 1.52 | 2.11 | 1.52 | 2.02 | 2.48 |
|  | $TiO_2$ | mol % | 0.0042 | 0.0034 | 0.0025 | 0.0017 | 0.0026 |
|  | $ZrO_2$ | mol % | 0.0162 | 0.0109 | 0.0135 | 0.0098 | 0.0055 |
|  | $SnO_2$ | mol % | 0.0882 | 0.0893 | 0.0884 | 0.0894 | 0.0903 |
|  | $Fe_2O_3$ | mol % | 0.0042 | 0.0038 | 0.0046 | 0.0051 | 0.0051 |
| β-OH |  | /mm | 0.15 | 0.15 | 0.15 | 0.15 | 0.15 |
| Density |  | g/cm³ | 2.555 | 2.581 | 2.563 | 2.581 | 2.604 |
| Thermal expansion coefficient |  | ×10⁻⁷/° C. | 38.4 | 39.0 | 39.3 | 39.6 | 39.4 |
| Young's modulus |  | GPa | 83.7 | 83.0 | 83.2 | 82.4 | 82.2 |
| Strain point |  | ° C. | 722 | 721 | 721 | 720 | 720 |
| Temperature at $10^{4.5}$ dPa · s |  | ° C. | 1,243 | 1,246 | 1,244 | 1,247 | 1,250 |
| Liquidus temperature |  | ° C. | 1,208 | 1,210 | 1,239 | 1,216 | 1,211 |
| Liquidus viscosity (log η at TL) |  | dPa · s | 4.8 | 4.9 | 4.6 | 4.8 | 4.9 |
| Thermal shrinkage rate (500° C., 1 hour) |  | ppm | 12.2 | 12.3 | 12.3 | 12.4 | 12.4 |
|  |  |  | No. 16 | No. 17 | No. 18 | No. 19 | No. 20 |
| Glass composition | $SiO_2$ | mol % | 67.87 | 67.72 | 67.76 | 67.94 | 64.89 |
|  | $Al_2O_3$ | mol % | 12.02 | 12.02 | 11.98 | 11.98 | 13.97 |
|  | $B_2O_3$ | mol % | 3.00 | 3.03 | 3.04 | 2.97 | 3.98 |
|  | $Na_2O$ | mol % | 0.0126 | 0.0149 | 0.0107 | 0.0140 | 0.0131 |
|  | $K_2O$ | mol % | 0.0028 | 0.0014 | 0.0021 | 0.0021 | 0.0014 |
|  | MgO | mol % | 6.95 | 7.03 | 6.06 | 5.96 | 7.03 |
|  | CaO | mol % | 8.02 | 7.05 | 8.01 | 7.02 | 6.02 |
|  | SrO | mol % | 1.01 | 1.53 | 1.53 | 2.00 | 2.02 |
|  | BaO | mol % | 1.02 | 1.50 | 1.51 | 2.00 | 1.98 |
|  | $TiO_2$ | mol % | 0.0024 | 0.0016 | 0.0008 | 0.0021 | 0.0013 |
|  | $ZrO_2$ | mol % | 0.0063 | 0.0075 | 0.0064 | 0.0070 | 0.0082 |
|  | $SnO_2$ | mol % | 0.0865 | 0.0874 | 0.0876 | 0.0886 | 0.0896 |
|  | $Fe_2O_3$ | mol % | 0.0053 | 0.0058 | 0.0050 | 0.0042 | 0.0042 |
| β-OH |  | /mm | 0.15 | 0.15 | 0.15 | 0.15 | 0.18 |
| Density |  | g/cm³ | 2.527 | 2.548 | 2.551 | 2.572 | 2.582 |
| Thermal expansion coefficient |  | ×10⁻⁷/° C. | 37.5 | 37.9 | 38.6 | 39.1 | 38.3 |
| Young's modulus |  | GPa | 83.7 | 83.3 | 82.8 | 82.7 | 83.2 |
| Strain point |  | ° C. | 717 | 716 | 717 | 715 | 718 |
| Temperature at $10^{4.5}$ dPa · s |  | ° C. | 1,245 | 1,247 | 1,247 | 1,253 | 1,227 |
| Liquidus temperature |  | ° C. | 1,258 | 1,222 | 1,221 | 1,234 | 1,193 |
| Liquidus viscosity (log η at TL) |  | dPa · s | 4.5 | 4.7 | 4.7 | 4.7 | 4.8 |
| Thermal shrinkage rate (500° C., 1 hour) |  | ppm | 12.8 | 12.9 | 12.8 | 13.0 | 12.7 |

TABLE 3

|  |  |  | No. 21 | No. 22 | No. 23 | No. 24 | No. 25 |
|---|---|---|---|---|---|---|---|
| Glass composition | $SiO_2$ | mol % | 64.90 | 64.88 | 65.75 | 65.80 | 65.85 |
|  | $Al_2O_3$ | mol % | 14.10 | 14.01 | 14.03 | 14.01 | 13.99 |
|  | $B_2O_3$ | mol % | 3.93 | 4.05 | 3.00 | 3.04 | 2.98 |
|  | $Na_2O$ | mol % | 0.0122 | 0.0155 | 0.0131 | 0.0099 | 0.0112 |
|  | $K_2O$ | mol % | 0.0007 | 0.0007 | 0.0014 | 0.0022 | 0.0022 |
|  | MgO | mol % | 5.95 | 5.96 | 7.03 | 5.93 | 4.98 |
|  | CaO | mol % | 5.98 | 6.98 | 6.02 | 6.09 | 6.05 |
|  | SrO | mol % | 2.51 | 0.00 | 2.02 | 2.51 | 3.01 |
|  | BaO | mol % | 2.50 | 3.99 | 2.02 | 2.50 | 3.02 |
|  | $TiO_2$ | mol % | 0.0026 | 0.0017 | 0.0034 | 0.0043 | 0.0035 |
|  | $ZrO_2$ | mol % | 0.0100 | 0.0134 | 0.0131 | 0.0111 | 0.0056 |
|  | $SnO_2$ | mol % | 0.0909 | 0.0912 | 0.0896 | 0.0907 | 0.0919 |
|  | $Fe_2O_3$ | mol % | 0.0039 | 0.0052 | 0.0046 | 0.0047 | 0.0039 |
| β-OH |  | /mm | 0.18 | 0.18 | 0.15 | 0.15 | 0.14 |
| Density |  | g/cm³ | 2.603 | 2.609 | 2.586 | 2.610 | 2.633 |

TABLE 3-continued

| | | | | | | |
|---|---|---|---|---|---|---|
| Thermal expansion coefficient | ×10⁻⁷/° C. | 39.3 | 39.0 | 38.2 | 39.3 | 40.4 |
| Young's modulus | GPa | 82.3 | 81.7 | 84.1 | 83.1 | 82.4 |
| Strain point | ° C. | 716 | 715 | 727 | 726 | 725 |
| Temperature at 10⁴·⁵ dPa · s | ° C. | 1,232 | 1,228 | 1,241 | 1,247 | 1,250 |
| Liquidus temperature | ° C. | 1,200 | 1,186 | 1,200 | 1,205 | 1,191 |
| Liquidus viscosity (log η at TL) | dPa · s | 4.8 | 4.9 | 4.9 | 4.9 | 5.1 |
| Thermal shrinkage rate (500° C., 1 hour) | ppm | 12.9 | 13.0 | 11.7 | 11.8 | 11.9 |

| | | | No. 26 | No. 27 | No. 28 | No. 29 | No. 30 |
|---|---|---|---|---|---|---|---|
| Glass composition | SiO₂ | mol % | 65.76 | 65.86 | 66.83 | 66.86 | 66.80 |
| | Al₂O₃ | mol % | 13.02 | 14.01 | 12.98 | 13.01 | 13.99 |
| | B₂O₃ | mol % | 3.01 | 3.99 | 4.03 | 3.97 | 3.01 |
| | Na₂O | mol % | 0.0131 | 0.0109 | 0.0108 | 0.0109 | 0.0131 |
| | K₂O | mol % | 0.0014 | 0.0022 | 0.0021 | 0.0014 | 0.0022 |
| | MgO | mol % | 7.05 | 6.05 | 5.97 | 6.01 | 6.04 |
| | CaO | mol % | 6.04 | 6.04 | 7.03 | 6.00 | 6.03 |
| | SrO | mol % | 2.48 | 1.96 | 1.03 | 2.01 | 2.02 |
| | BaO | mol % | 2.52 | 1.99 | 2.01 | 2.02 | 1.98 |
| | TiO₂ | mol % | 0.0034 | 0.0025 | 0.0025 | 0.0025 | 0.0034 |
| | ZrO₂ | mol % | 0.0055 | 0.0110 | 0.0054 | 0.0027 | 0.0044 |
| | SnO₂ | mol % | 0.0899 | 0.0898 | 0.0887 | 0.0894 | 0.0897 |
| | Fe₂O₃ | mol % | 0.0038 | 0.0034 | 0.0042 | 0.0051 | 0.0047 |
| β-OH | /mm | | 0.15 | 0.18 | 0.18 | 0.18 | 0.15 |
| Density | g/cm³ | | 2.612 | 2.571 | 2.549 | 2.564 | 2.576 |
| Thermal expansion coefficient | ×10⁻⁷/° C. | | 40.1 | 37.6 | 37.4 | 37.8 | 37.4 |
| Young's modulus | GPa | | 83.2 | 82.4 | 81.9 | 81.7 | 83.5 |
| Strain point | ° C. | | 717 | 721 | 715 | 715 | 729 |
| Temperature at 10⁴·⁵ dPa · s | ° C. | | 1,235 | 1,242 | 1,241 | 1,246 | 1,261 |
| Liquidus temperature | ° C. | | 1,222 | 1,195 | 1,223 | 1,213 | 1,219 |
| Liquidus viscosity (log η at TL) | dPa · s | | 4.6 | 5.0 | 4.7 | 4.8 | 4.9 |
| Thermal shrinkage rate (500° C., 1 hour) | ppm | | 12.8 | 12.3 | 13.0 | 13.0 | 11.5 |

TABLE 4

| | | | No. 31 | No. 32 | No. 33 | No. 34 | No. 35 |
|---|---|---|---|---|---|---|---|
| Glass composition | SiO₂ | mol % | 64.87 | 66.15 | 65.77 | 66.80 | 66.79 |
| | Al₂O₃ | mol % | 13.99 | 13.84 | 14.00 | 14.03 | 14.00 |
| | B₂O₃ | mol % | 4.04 | 3.96 | 4.00 | 2.99 | 3.01 |
| | Na₂O | mol % | 0.0122 | 0.0130 | 0.0110 | 0.0130 | 0.0109 |
| | K₂O | mol % | 0.0015 | 0.0021 | 0.0022 | 0.0029 | 0.0022 |
| | MgO | mol % | 6.97 | 6.00 | 6.07 | 6.00 | 6.04 |
| | CaO | mol % | 5.99 | 6.95 | 6.06 | 7.07 | 6.03 |
| | SrO | mol % | 0.00 | 0.97 | 1.51 | 0.97 | 2.02 |
| | BaO | mol % | 4.02 | 2.02 | 2.48 | 2.02 | 1.98 |
| | TiO₂ | mol % | 0.0026 | 0.0042 | 0.0017 | 0.0025 | 0.0042 |
| | ZrO₂ | mol % | 0.0056 | 0.0082 | 0.0099 | 0.0109 | 0.0165 |
| | SnO₂ | mol % | 0.0910 | 0.0892 | 0.0902 | 0.0891 | 0.0897 |
| | Fe₂O₃ | mol % | 0.0043 | 0.0042 | 0.0038 | 0.0038 | 0.0042 |
| β-OH | /mm | | 0.18 | 0.18 | 0.18 | 0.15 | 0.15 |
| Density | g/cm³ | | 2.608 | 2.557 | 2.577 | 2.563 | 2.576 |
| Thermal expansion coefficient | ×10⁻⁷/° C. | | 38.6 | 37.2 | 37.7 | 37.2 | 37.2 |
| Young's modulus | GPa | | 82.9 | 83.1 | 82.8 | 84.0 | 83.6 |
| Strain point | ° C. | | 716 | 719 | 719 | 730 | 731 |
| Temperature at 10⁴·⁵ dPa · s | ° C. | | 1,230 | 1,235 | 1,238 | 1,252 | 1,254 |
| Liquidus temperature | ° C. | | 1,207 | 1,192 | 1,189 | 1,221 | 1,202 |
| Liquidus viscosity (log η at TL) | dPa · s | | 4.7 | 4.9 | 5.0 | 4.8 | 5.0 |
| Thermal shrinkage rate (500° C., 1 hour) | ppm | | 12.9 | 12.6 | 12.6 | 11.4 | 11.3 |

| | | | No. 36 | No. 37 | No. 38 | No. 39 | No. 40 |
|---|---|---|---|---|---|---|---|
| Glass composition | SiO₂ | mol % | 66.22 | 66.88 | 66.64 | 67.87 | 66.77 |
| | Al₂O₃ | mol % | 14.51 | 14.03 | 14.04 | 12.99 | 14.03 |
| | B₂O₃ | mol % | 3.02 | 2.99 | 3.03 | 2.99 | 2.96 |

TABLE 4-continued

|  |  |  |  |  |  |  |
|---|---|---|---|---|---|---|
| | Na$_2$O | mol % | 0.0109 | 0.0108 | 0.0121 | 0.0108 | 0.0133 |
| | K$_2$O | mol % | 0.0014 | 0.0021 | 0.0014 | 0.0021 | 0.0029 |
| | MgO | mol % | 6.06 | 6.00 | 6.09 | 6.00 | 5.12 |
| | CaO | mol % | 6.05 | 5.99 | 6.08 | 5.99 | 6.01 |
| | SrO | mol % | 2.03 | 2.98 | 0.99 | 2.01 | 1.99 |
| | BaO | mol % | 1.99 | 1.01 | 3.02 | 2.02 | 3.00 |
| | TiO$_2$ | mol % | 0.0034 | 0.0025 | 0.0017 | 0.0025 | 0.0026 |
| | ZrO$_2$ | mol % | 0.0110 | 0.0136 | 0.0100 | 0.0055 | 0.0067 |
| | SnO$_2$ | mol % | 0.0900 | 0.0891 | 0.0904 | 0.0892 | 0.0912 |
| | Fe$_2$O$_3$ | mol % | 0.0038 | 0.0046 | 0.0051 | 0.0051 | 0.0056 |
| β-OH | | /mm | 0.15 | 0.15 | 0.15 | 0.15 | 0.14 |
| Density | | g/cm$^3$ | 2.581 | 2.563 | 2.589 | 2.567 | 2.606 |
| Thermal expansion coefficient | | ×10$^{-7}$/° C. | 37.0 | 37.1 | 37.2 | 37.3 | 38.5 |
| Young's modulus | | GPa | 84.1 | 83.9 | 83.3 | 82.8 | 82.6 |
| Strain point | | ° C. | 733 | 733 | 733 | 727 | 730 |
| Temperature at 10$^{4.5}$ dPa · s | | ° C. | 1,251 | 1,253 | 1,258 | 1,260 | 1,259 |
| Liquidus temperature | | ° C. | 1,239 | 1,214 | 1,208 | 1,188 | 1,204 |
| Liquidus viscosity (log η at TL) | | dPa · s | 4.6 | 4.9 | 5.0 | 5.2 | 5.0 |
| Thermal shrinkage rate (500° C., 1 hour) | | ppm | 11.0 | 11.0 | 11.0 | 11.7 | 11.4 |

TABLE 5

|  |  |  | No. 41 | No. 42 | No. 43 | No. 44 | No. 45 | No. 46 |
|---|---|---|---|---|---|---|---|---|
| Glass composition | SiO$_2$ | mol % | 67.14 | 67.65 | 67.78 | 66.85 | 67.06 | 67.33 |
| | Al$_2$O$_3$ | mol % | 12.18 | 13.03 | 13.01 | 13.03 | 13.47 | 13.02 |
| | B$_2$O$_3$ | mol % | 2.91 | 3.03 | 2.93 | 4.05 | 2.93 | 2.93 |
| | Na$_2$O | mol % | 0.0109 | 0.0110 | 0.0143 | 0.0130 | 0.0121 | 0.0110 |
| | K$_2$O | mol % | 0.0014 | 0.0022 | 0.0022 | 0.0014 | 0.0007 | 0.0007 |
| | MgO | mol % | 6.87 | 5.07 | 5.57 | 5.99 | 5.57 | 5.06 |
| | CaO | mol % | 6.26 | 6.56 | 6.55 | 6.46 | 6.55 | 6.55 |
| | SrO | mol % | 1.30 | 1.51 | 0.53 | 1.49 | 1.51 | 2.50 |
| | BaO | mol % | 3.21 | 3.02 | 3.51 | 2.01 | 2.79 | 2.49 |
| | TiO$_2$ | mol % | 0.0017 | 0.0026 | 0.0021 | 0.0025 | 0.0026 | 0.0017 |
| | ZrO$_2$ | mol % | 0.0077 | 0.0066 | 0.0072 | 0.0082 | 0.0099 | 0.0133 |
| | SnO$_2$ | mol % | 0.0896 | 0.0904 | 0.0903 | 0.0891 | 0.0902 | 0.0903 |
| | Fe$_2$O$_3$ | mol % | 0.0059 | 0.0051 | 0.0043 | 0.0042 | 0.0038 | 0.0051 |
| β-OH | | /mm | 0.14 | 0.15 | 0.14 | 0.18 | 0.14 | 0.14 |
| Density | | g/cm$^3$ | 2.596 | 2.590 | 2.588 | 2.554 | 2.592 | 2.619 |
| Thermal expansion coefficient | | ×10$^{-7}$/° C. | 38.8 | 38.5 | 38.1 | 37.5 | 38.4 | 40.4 |
| Young's modulus | | GPa | 82.4 | 82.0 | 82.1 | 82.1 | 82.9 | 82.0 |
| Strain point | | ° C. | 718 | 726 | 727 | 717 | 728 | 721 |
| Temperature at 10$^{4.5}$ dPa · s | | ° C. | 1,250 | 1,263 | 1,262 | 1,244 | 1,256 | 1,251 |
| Liquidus temperature | | ° C. | 1,158 | 1,202 | 1,181 | 1,173 | 1,200 | 1,227 |
| Liquidus viscosity (log η at TL) | | dPa · s | 5.4 | 5.1 | 5.3 | 5.2 | 5.1 | 4.7 |
| Thermal shrinkage rate (500° C., 1 hour) | | ppm | 12.7 | 11.8 | 11.7 | 12.8 | 11.6 | 12.3 |

|  |  |  | No. 47 | No. 48 | No. 49 | No. 50 | No. 51 |
|---|---|---|---|---|---|---|---|
| Glass composition | SiO$_2$ | mol % | 67.21 | 67.37 | 67.88 | 67.88 | 67.52 |
| | Al$_2$O$_3$ | mol % | 12.19 | 12.59 | 12.70 | 13.00 | 13.11 |
| | B$_2$O$_3$ | mol % | 2.86 | 2.99 | 3.00 | 3.00 | 3.30 |
| | Na$_2$O | mol % | 0.0129 | 0.0098 | 0.0108 | 0.0109 | 0.0067 |
| | K$_2$O | mol % | 0.0014 | 0.0021 | 0.0021 | 0.0022 | 0.0004 |
| | MgO | mol % | 6.93 | 6.00 | 6.00 | 5.70 | 6.16 |
| | CaO | mol % | 7.23 | 6.59 | 6.30 | 6.30 | 6.50 |
| | SrO | mol % | 1.28 | 2.33 | 1.70 | 1.40 | 1.59 |
| | BaO | mol % | 2.17 | 2.02 | 2.30 | 2.60 | 1.69 |
| | TiO$_2$ | mol % | 0.0033 | 0.0025 | 0.0025 | 0.0025 | 0.0028 |
| | ZrO$_2$ | mol % | 0.0129 | 0.0109 | 0.0055 | 0.0055 | 0.0101 |
| | SnO$_2$ | mol % | 0.0882 | 0.0892 | 0.0892 | 0.0897 | 0.0958 |
| | Fe$_2$O$_3$ | mol % | 0.0046 | 0.0046 | 0.0042 | 0.0042 | 0.0035 |
| β-OH | | /mm | 0.14 | 0.15 | 0.15 | 0.15 | 0.10 |
| Density | | g/cm$^3$ | 2.574 | 2.561 | 2.572 | 2.569 | 2.549 |
| Thermal expansion coefficient | | ×10$^{-7}$/° C. | 39.1 | 37.7 | 38.1 | 37.3 | 37.1 |

TABLE 5-continued

| | | | | | | |
|---|---|---|---|---|---|---|
| Young's modulus | GPa | 83.4 | 82.4 | 82.5 | 81.7 | 83.0 |
| Strain point | ° C. | 717 | 726 | 723 | 728 | 725 |
| Temperature at $10^{4.5}$ dPa·s | ° C. | 1,241 | 1,258 | 1,256 | 1,266 | 1,255 |
| Liquidus temperature | ° C. | 1,192 | 1,201 | 1,196 | 1,207 | 1,184 |
| Liquidus viscosity (log η at TL) | dPa·s | 5.0 | 5.1 | 5.1 | 5.1 | 5.2 |
| Thermal shrinkage rate (500° C., 1 hour) | ppm | 12.8 | 11.8 | 12.1 | 11.6 | 14.0 |

Each sample was produced in the following manner. First, a glass batch prepared by blending glass raw materials so that each glass composition listed in the tables was attained was placed in a platinum crucible and melted at 1,600° C. for 24 hours. When the glass batch was dissolved, molten glass was stirred to be homogenized by using a platinum stirrer. Next, the molten glass was poured on a carbon sheet and formed into a flat sheet shape. Each of the resultant samples was evaluated for its β-OH value, density, thermal expansion coefficient, Young's modulus, strain point, temperature at $10^{4.5}$ dPa·s, liquidus temperature, liquidus viscosity, and thermal shrinkage rate.

The β-OH value is a value calculated by using the above-mentioned equation.

The density is a value measured by a well-known Archimedes method.

The thermal expansion coefficient is an average thermal expansion coefficient measured in the temperature range of from 30° C. to 380° C. with a dilatometer.

The Young's modulus is a value measured by a dynamic elastic modulus measurement method (resonance method) based on JIS R1602.

The strain point is a value measured on the basis of a method of ASTM C336.

The temperature at a viscosity at high temperature of $10^{4.5}$ dPa·s is a value measured by a platinum sphere pull up method.

The liquidus temperature is a temperature at which a devitrified crystal (crystalline foreign matter) was observed in glass when each of the samples was pulverized and glass powder that passed through a standard 30-mesh sieve (500 μm) and remained on a 50-mesh sieve (300 μm) was placed in a platinum boat and kept for 24 hours in a gradient heating furnace set to from 1,100° C. to 1,350° C., followed by taking the platinum boat out of the gradient heating furnace. The liquidus viscosity is a value obtained by measuring the viscosity of glass at its liquidus temperature by the platinum sphere pull up method.

A measurement sample for the thermal shrinkage rate was produced by the following method. First, a glass substrate measuring 160 mm by 30 mm was prepared. The glass substrate was increased in temperature to 900° C., and then decreased in temperature to 500° C. over about 180 seconds, followed by natural cooling. The annealing conditions correspond to annealing conditions obtained by making an annealing path longer than in the related art and making an annealing rate lower than in the related art in an overflow down-draw method. The measurement sample was measured for its thermal shrinkage rate in accordance with the above-mentioned measurement method.

Each of Sample Nos. 1 to 51 has a thermal expansion coefficient of from $37\times10^{-7}$/° C. to $40\times10^{-7}$/° C., a Young's modulus of 80 GPa or more, a strain point of 715° C. or more, and a thermal shrinkage rate of 14.0 ppm or less, and hence is conceivably capable of reducing dimensional change at the time of heat treatment. In addition, each of Sample Nos. 1 to 51 has a temperature at $10^{4.5}$ dPa·s of 1,270° C. or less, a liquidus temperature of 1,260° C. or less, and a liquidus viscosity of $10^{4.5}$ dPa·s or more, and hence can enhance the production efficiency of a glass substrate.

Example 2

A glass batch for attaining the glass composition of each of Sample Nos. 1 to 51 shown in Tables 1 to 5 was melted in a test melting furnace to provide molten glass, followed by forming into a G10.5-sized mother glass sheet having a thickness of 0.5 mm by an overflow down-draw method. After that, two G6-sized glass substrates were obtained by cutting the mother glass sheet. In the forming, an annealing path was made longer than in the related art, and an annealing rate was made lower than in the related art. Thus, glass substrates having thermal shrinkage rates corresponding to Sample Nos. 1 to 51 shown in Tables 1 to 5 were obtained.

The invention claimed is:

1. A glass substrate comprising as a glass composition, in terms of mol %, 10% to 15% of $Al_2O_3$, 0% to 0.1% of $Li_2O$, 0% to 0.1% of $Na_2O$, 0% to 1% of $K_2O$, 0% to 8% of MgO, 0% to 10% of CaO, 0% to 10% of SrO, 0% to 3.51% of BaO, 0% to 10% of ZnO, 0% to 10% of $P_2O_5$, 0% to 1% of $SnO_2$, 60% to −70% 68% of $SiO_2$ and 2% to 4.5% of $B_2O_3$, and having a strain point of from 713° C. to 740° C., a temperature at 104.5 dPa·s of 1,300° C. or less, a liquidus viscosity of 104.5 dPa·s or more, a Young's modulus of 78 GPa or more, and a thermal shrinkage rate in heat treatment at 500° C. for 1 hour of 20 ppm or less.

* * * * *